United States Patent [19]
Hestehave et al.

[11] Patent Number: 5,827,471
[45] Date of Patent: Oct. 27, 1998

[54] BLOW MOLDED CONTAINER WITH IMPROVED NECK WITH LOCKING TEETH AND METHOD FOR FORMING SAME

[75] Inventors: Borge Hestehave, Alta Loma; Kjeld Hestehave, Upland, both of Calif.

[73] Assignee: Bomatic, Inc., Ontario, Calif.

[21] Appl. No.: 812,454

[22] Filed: Mar. 6, 1997

[51] Int. Cl.⁶ .................................................. B28B 5/00
[52] U.S. Cl. ................. 264/645; 264/5; 264/13; 264/464; 264/478; 264/632; 264/500; 264/503; 264/570; 264/572; 264/239; 264/299
[58] Field of Search ................. 264/5, 13, 464, 264/477, 478, 31, 603, 629, 632, 633, 634, 638, 645, 667, 671, 500, 503, 540, 541, 570, 572, 219, 220, 222, 225, 226, 239, 298, 299, 340

[56] References Cited

U.S. PATENT DOCUMENTS

| | | | |
|---|---|---|---|
| 3,881,623 | 5/1975 | Landen | 215/216 |
| 5,238,130 | 8/1993 | Marques et al. | 215/216 |
| 5,553,727 | 9/1996 | Molinaro | 215/44 |

*Primary Examiner*—Ardin H. Marschel
*Attorney, Agent, or Firm*—Sixbey, Friedman, Leedom & Ferguson; David S. Safran

[57] ABSTRACT

A blow molded container is provided which includes a neck portion having locking teeth with features which ensure the proper formation of the teeth. Specifically, the container neck portion includes an annular inclined surface extending from both the upper and lower sides of the teeth, while all edges of the teeth are rounded. The annular inclined surfaces and the rounded edges ensure that the teeth are formed with sufficient material to ensure strong, sturdy teeth devoid of weak areas, holes or cracks. A method of forming the container is also provided which includes rounding all edges of the teeth as a parison abuts molds so as to inhibit undesirable stretching of the material forming the teeth. The method may also include forming the annular inclined surfaces to further inhibit undesirable stretching of the material forming the teeth thus ensuring proper formation of the teeth.

15 Claims, 1 Drawing Sheet

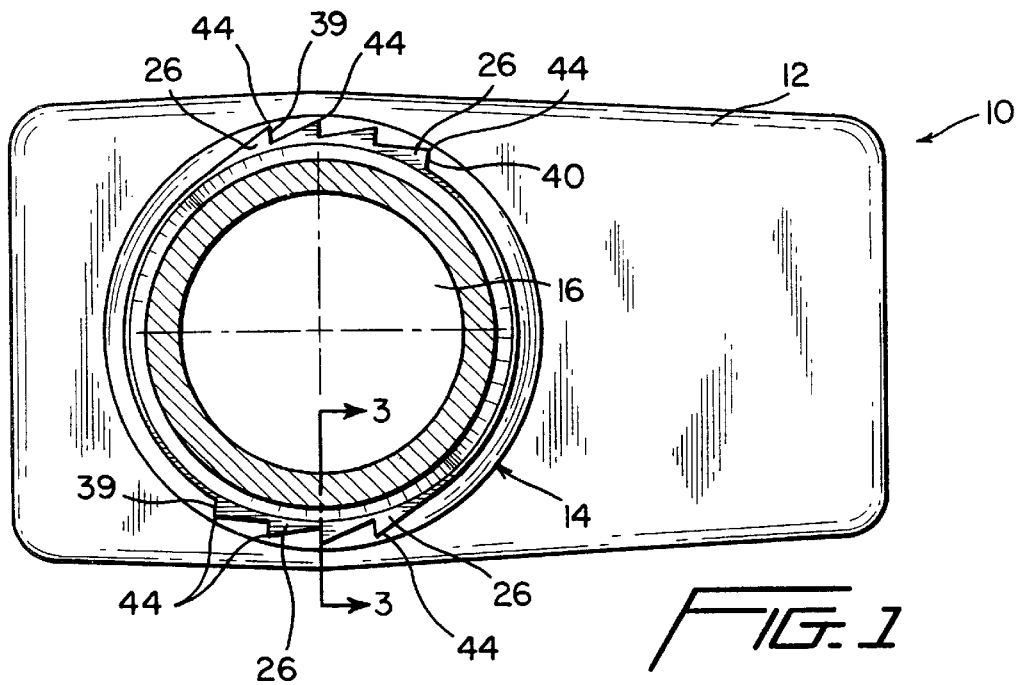
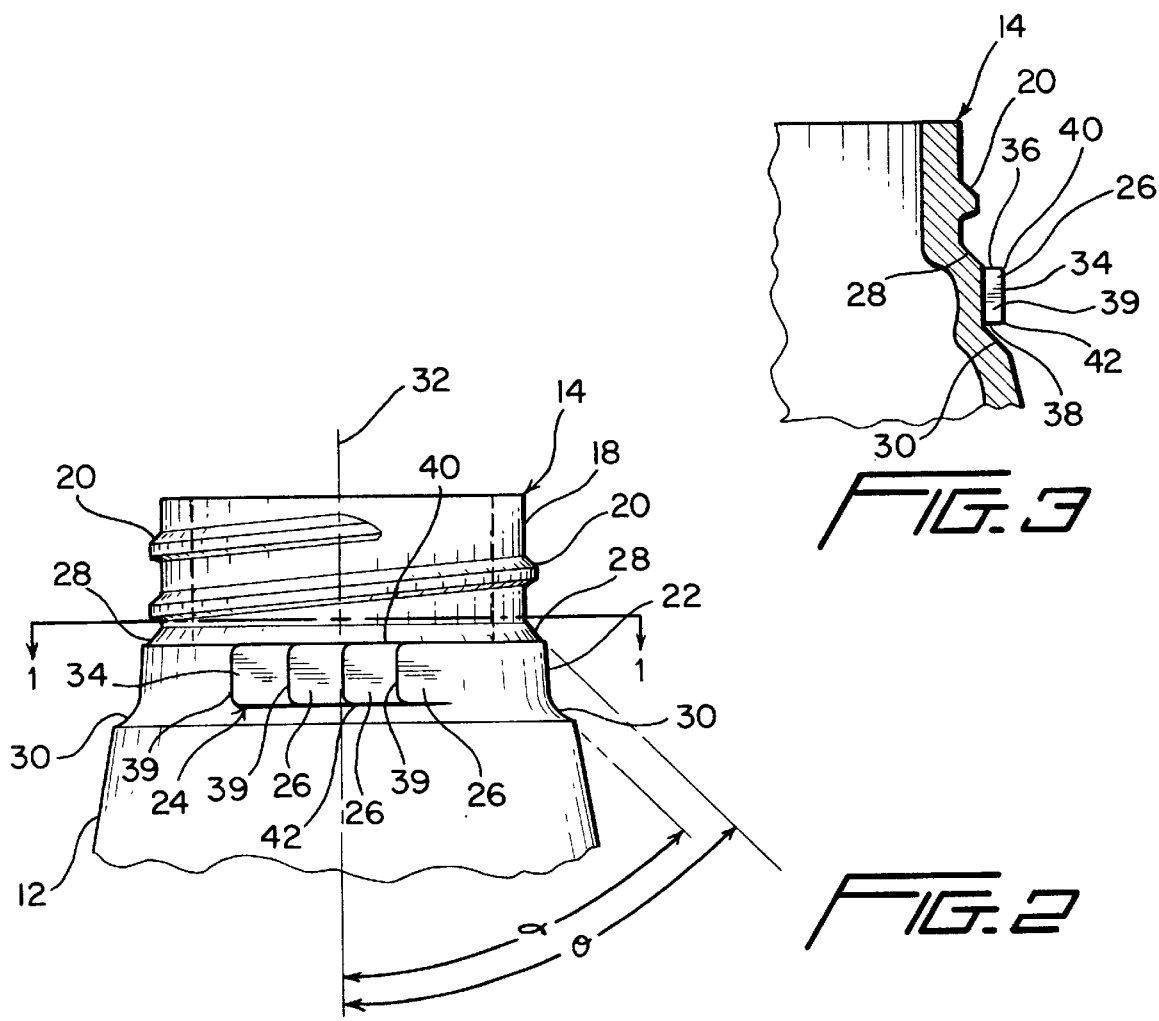

BLOW MOLDED CONTAINER WITH IMPROVED NECK WITH LOCKING TEETH AND METHOD FOR FORMING SAME

BACKGROUND OF THE INVENTION

1. Field of the Invention

This invention relates generally to a container formed from a blow molding process which includes a container neck having locking teeth designed to permit the effective and reliable formation of the container neck, and a blow molding method for forming such containers.

2. Description of Related Art

Containers, such as bottles, for use in a variety of applications are often formed using a blow molding process. Blow molding typically includes the positioning of a parison in a cavity formed in a mold assembly. The mold assembly usually consists of two mold halves which are brought together to enclose the parison. The a blow needle is then operated to inject gas into the hollow portion of the parison causing the parison to expand outwardly to contact, and conform to, the shape of the inside surface of the mold. Once the mold halves are separated, a container, having the shape of mold, is removed.

The above-described blow molding process often effectively and completely forms containers having various shapes and features. For instance, U.S. Pat. No. 5,238,130 to Marques et al. discloses a container formed by blow molding a polyethylene material. The container includes a container neck having teeth for releasable engagement by projections formed on a container cap. However, applicants have found that the blow molding process tends to result in container neck teeth and surrounding surfaces formed of extremely thin walls due to undesirable stretching of the material. As a result, the teeth are capable of flexing under the application of force thus disadvantageously permitting removal of the cap. The undesirable stretching of the material results from the inner surface of the mold, and thus the teeth of the container, being formed with sharp, well defined edges formed by the intersection of the surfaces of the teeth. Also, the surfaces of the container, on both the bottom and top of the row of teeth, extend from the teeth at excessively abrupt angles relative to the lower and upper edges of the teeth. These sharp tooth edges and abrupt changes in the surface of the neck at and around the teeth, hinder the even distribution or stretching of material in this area. The resulting thin walls may be so weak as to cause the edges of the teeth to crack or break open resulting in leakage from the container. In extreme cases, the distribution of the material is so impeded that the teeth are only partially formed resulting in small openings or cracks in the teeth and/or surrounding surfaces.

The above-noted problems with the locking teeth of blow molded containers are especially disadvantageous when the container and cap are to be permanently connected and sealed. For instance, in the disposal of certain toxic chemicals, the cap is permanently locked onto the container neck or to prevent re-use of toxic material containers, such as pesticide and herbicide spray containers. The entire container and cap assembly is either disposed of, or processed, without removing the cap. Any leakage from the container, perhaps through cracks in the teeth and surrounding areas, could be extremely hazardous to both the user and the environment, or could enable removal of a sprayhead type cap and re-use of the container for other materials with potentially tragic consequences.

U.S. Pat. No. 5,553,727 to Molinaro discloses a tamper-evident cap and neck portion for a blow-molded container. The neck portion includes a plurality of teeth extending around a portion of the neck for engaging the teeth formed on the cap. However, the teeth are formed with sharp, well defined edges. Also, the surfaces of the neck, extending from both the top and bottom of the teeth, create excessively abrupt changes in the surface of the neck.

Consequently, there is a need for a container having an improved container neck with locking teeth which can be effectively and reliably formed using a blow molding process to create sturdy teeth, and a blow molding process capable of forming such a container.

SUMMARY OF THE INVENTION

It is an object of the present invention, therefore, to overcome the disadvantages of the prior art and to provide a blow molded container with improved locking teeth formed on a neck portion of the container.

It is another object of the present invention to provide a container having an improved container neck with locking teeth which can be effectively and reliably formed using a blow molding process to create sturdy teeth.

Another object of the present invention is to provide a blow molded container having locking teeth which are capable of preventing leakage from the container.

A still further object of the present invention is to provide a blow molded container with locking teeth completely devoid of any cracks and weak areas.

Yet another object of the present invention is to provide a blow molded container with locking teeth formed of a thickness sufficient to provide adequate strength to the teeth.

It is a still further object of the present invention to provide a method for blow molding a container having a neck portion with locking teeth which includes rounding all edges of the teeth as a parison abuts the molds so as to inhibit undesirable stretching of the material forming the teeth.

Another object of the present invention is to provide a method for blow molding a container which forms annular inclined surfaces extending from the upper and lower sides of the teeth area so as to further inhibit undesirable stretching of the material forming the teeth.

These and other objects of the present invention are achieved by providing a container formed by a blow molding process comprising a body portion for containing a product and a neck portion extending from the body portion which includes a first annular wall, a thread formed on the first annular wall for engagement by a cap, a second annular wall positioned between the first annular wall and the body portion, and a locking device for permanently securing the cap to the neck portion. The locking device includes a plurality of teeth extending radially outwardly from the second annular wall. The neck portion further includes a first annular inclined surface extending between the first annular wall and the second annular wall outwardly at a first oblique angle from a longitudinal axis of the neck portion. The neck portion also includes a second annular inclined surface extending between the second annular wall and the body portion outwardly at a second oblique angle from the longitudinal axis of the neck portion. A plurality of teeth are positioned between the first and second annular inclined surfaces. Each of the first and second oblique angles is an angle between approximately 40 degrees and 50 degrees. Preferably, the first and second oblique angles are approximately 45 degrees. Each of the plurality of teeth may include a number of edges that are rounded. Specifically, each tooth includes an outer surface facing outwardly, a top surface, a bottom surface and a transverse surface. The top and bottom surfaces are connected to the outer surface by first and second rounded edge portions, while the outer surface and the transverse surface may be connected by a third rounded edge portion. The first, second and third rounded edge portions are each formed by a radius of curvature in the range of approximately 0.030 to 0.060 inches. Preferably, the radius of curvature for the rounded edge portions is between 0.035 and 0.040 inches.

A method of forming a container is also provided wherein the container includes a body portion and a neck portion with locking teeth. The method includes the steps of extruding a parison formed of a pliable material, positioning the parison between molds having inner surfaces shaped to produce a desired shaped container and injecting gas into the parison to expand the parison outwardly into abutment with the molds to form the container. The improvement of the method of the present invention comprises the steps of rounding all edges of the teeth as the parison abuts the mold so as to inhibit undesirable stretching of the material forming the teeth.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 is a top cross sectional view of the blow molded container of the present invention taken along plane 1—1 in FIG. 3;

FIG. 2 is a side view of the neck portion of the container of FIG. 1; and

FIG. 3. is a partial cross sectional view of the neck portion taken along plane 3—3 in FIG. 1.

DESCRIPTION OF THE PREFERRED EMBODIMENT

As shown in FIG. 1, the blow molded container of the present invention, indicated generally at 10, includes a body portion 12 for containing a product and a neck portion 14 extending from body portion 12 to form an opening 16 for permitting passage of the product into body portion 12. Although shown with a generally rectangular shape, body portion 12 may be formed of any size and shape desired for a particular application. Container 10, including body portion 12 and neck portion 14, is specifically designed to be formed by a blow molding process so as to ensure the optimum formation of the various features of neck portion 14 as discussed more fully hereinbelow.

Referring to FIGS. 1–3, neck portion 14 includes a first annular wall 18 having one or more screw threads 20 formed thereon for engagement by one or more threads of a cap (not shown) when the cap is rotatably mounted on neck portion 14. Neck portion 14 also includes a second annular wall 22 positioned between first annular wall 18 and body portion 12, and a locking device 24 formed on second annular wall 22. Locking device 24 includes a plurality of locking teeth 26 for abutment by one or more corresponding, conventional projections or teeth formed on the inner surface of a cap in a well known manner. The teeth 26, preferably, are arranged in two sets of a limited number of teeth, i.e. 4, positioned diametrically on opposite sides of neck portion 14. This design permits the removal of the neck portion 14 from the mold halves without damaging the plurality of teeth 26. Blow molded container 10 of the present invention is intended to hold products which are to be permanently disposed of, or recycled, in container 10 without removal of the cap from neck portion 14, or to prevent re-use of a container that held a toxic material after the original contents have been used (e.g., a container which held a pesticide or herbicide) by permanently securing a sprayhead type cap to the container. Thus, the teeth 26 are formed with sufficient rigidity so as to prevent the removal of a cap designed to be permanently mounted on neck portion 14. That is, neck portion 14 and locking device 24 includes certain features which ensure the optimum formation of teeth 26 so as to provide a permanent locking connection between locking device 24 and a permanent cap.

Neck portion 14 further includes a first annular inclined surface 28 integrally connecting first annular wall 18 and second annular wall 22. Neck portion 14 also includes a second annular inclined surface 30 integrally connecting second annular wall 22 and body portion 12. First annular inclined surface 28 extends outwardly from first annular wall 18 at an oblique angle θ relative to the longitudinal axis 32 of neck portion 14. Thus, first annular inclined surface 28 extends outwardly to provide a sloping surface which meets with the upper, inner edge of teeth 26 as shown in FIG. 3. As shown in FIGS. 2 and 3, second annular inclined surface 30 extends outwardly from second annular wall 22 at an angle α from the longitudinal axis 32 of neck portion 14 to provide a sloping surface connecting with body portion 12. First and second annular inclined surfaces 28 and 30 function to ensure that the plurality of locking teeth 26 are formed of sufficient material during the blow molding process so as to create sturdy, inflexible teeth.

Specifically, first annular inclined surface 28 is advantageous over conventional designs in which the surface immediately adjacent the top edge of teeth 26 intersects the teeth at a 90 degree angle. Applicants have found that by forming first annular inclined surface 28 so as to extend through an angle θ which is between approximately 40 degrees and 50 degrees relative to the longitudinal axis 32 and the outer surface of second annular wall 22, the material forming neck portion 14 is more desirably distributed to the plurality of teeth 26. Likewise, the angle α at which second annular inclined surface 30 extends, is an angle between approximately 40 degrees and 50 degrees relative to the longitudinal axis 32 and the outer surface of second annular wall 22. Likewise, angle α is preferably approximately 45 degrees. Although angles α and θ are shown as having the same magnitude in the present embodiment, first annular inclined surface 28 and second annular inclined surface 30 may extend at different angles between approximately 40 degrees and 50 degrees. Second annular inclined surface 30 optimizes the stretching of material during the blow molding process by being positioned at an optimum angle relative to the bottom surface 38 of teeth 26. Extending from the bottom surface 38 at a 90 degree angle, as in conventional designs, requires excessive stretching of the material to form teeth 26, while extending at an angle which positions second annular inclined surface 30 closer to the bottom surface 38 of teeth 26 may prevent the proper formation and functioning of teeth 26.

Each tooth of the plurality of teeth 26 includes an outer surface 34 facing outwardly, a top surface 36, a bottom surface 38 and a transverse surface 39 extending generally radially relative to neck portion 14. Top surface 36 is connected to outer surface 34 by a first rounded edge portion 40 while bottom surface 38 is connected to outer surface 34 by a second rounded edge portion 42, as shown in FIG. 3. Also, outer surface 34 and transverse surface 39 are connected by a third rounded edge portion 44 as most clearly shown in FIG. 1. First and second rounded edge portions 40, 42, respectively, generally extend the length of each tooth while third rounded edge portion 44 extends vertically along the width of each tooth 26 as shown in FIG. 2. First, second and third rounded edge portions 40, 42 and 44, respectively, function to inhibit the undesirable stretching of the material forming teeth 26 during the blow molding process so as to ensure that each tooth is formed of a sufficient material to provide the desired strength. Applicants have found that by rounding all edge portions 40, 42 and 44 of teeth 26, undesirable stretching of the material during the blow molding process is minimized while maintaining the size and shape of the teeth necessary to performance of their locking function. The radius of curvature of rounded edge portions 40, 42, and 44 is maintained in the range of approximately 0.030 to 0.060 inches, and preferably, between 0.035 and 0.040 inches, to optimize the formation of teeth 26. The rounded edge portions 40, 42 and 44 prevent material from being stretched into the sharp cornered recesses forming conventional teeth thus permitting more effective use of the material in forming the tooth surfaces.

Thus, the present invention advantageously optimizes the distribution of material forming the plurality of teeth 26 during the blow molding process so as to inhibit the undesirable stretching of the material. As a result, the present invention creates sturdy, high strength teeth necessary to ensure the permanent connection of a cap to container 10. First and second annular inclined surfaces 28, 30 and rounded edge portions 40, 42 and 44 are formed by a mold surface having corresponding dimensions such that the blowing of the material against the mold prevents the undesirable stretching of the material so as to form locking teeth 26 of a sufficient thickness throughout to provide the strength necessary for maintaining a permanent connection to a cap. The blow formed container 10 of the present invention is formed by a blow forming method which includes the steps of extruding a parison formed of a pliable material, such as polypropylene, and positioning the parison between molds having inner surfaces shaped to produce the container 10. Specifically, the molds must be shaped to form first and second annular inclined surfaces 28 and 30, and first, second and third rounded edge portions 40, 42 and 44, respectively. In a conventional manner, a gas is injected into the parison to expand the parison outwardly into abutment with the molds so as to form the container. The method of the present invention, however, results in the rounding of all edges of the teeth as the parison abuts the molds due to the improved shape of the inner surface of the molds as required to form first annular inclined surface 28, second annular inclined surface 30 and first, second and third rounded edge portions 40, 42 and 44, respectively.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A container formed by a blow molding process, comprising:

a body portion for containing a product;

a neck portion extending from said body portion, said neck portion including a first annular wall, a second annular wall positioned between said first annular wall and said body portion, a first annular inclined surface extending outwardly from said first annular wall to said second annular wall at a first oblique angle from a longitudinal axis of said neck portion, and a second annular inclined surface extending outwardly from said second annular wall toward said body portion at a second oblique angle from the longitudinal axis of said neck portion, a thread formed on said first annular wall for engagement by a cap, and a locking means for permanently securing the cap to said neck portion, said locking means including a plurality of teeth extending radially outwardly from said second annular wall as blow molded portions thereof;

wherein each of said first and said second oblique angles is an angle of between approximately 40 degrees and 50 degrees; and wherein said inclined surfaces terminate near a root area of the teeth.

2. The blow molded container of claim 1, wherein each of said first and said second oblique angles is approximately 45 degrees.

3. The blow molded container of claim 1, wherein each of said plurality of teeth includes an outer surface facing outwardly, a top surface, a bottom surface and a transverse surface, said top and said bottom surfaces being connected to said outer surface by first and second rounded edge portions.

4. The blow molded container of claim 3, wherein said first and second rounded edge portions are each formed by a radius of curvature in the range of approximately 0.030 to 0.060 inches.

5. The blow molded container of claim 4, wherein said radius of curvature is between 0.035 and 0.040 inches.

6. The blow molded container of claim 3, wherein said outer surface and said transverse surface are connected by a third rounded edge portion.

7. The blow molded container of claim 6, wherein said third rounded edge portion is formed by a radius of curvature in the range of approximately 0.030 to 0.060 inches.

8. The blow molded container of claim 7, wherein said radius of curvature is approximately in the range of 0.035 to 0.040 inches.

9. The blow molded container of claim 1, wherein said teeth extend the full height of said second surface from said first annular inclined surface to said second annular inclined surface.

10. A container formed by a blow molding process, comprising:

a body portion for containing a product;

a neck portion extending from said body portion, said neck portion including a first annular wall, a thread formed on said first annular wall for engagement by a cap, a second annular wall positioned between said first annular wall and said body portion, and a locking means for permanently securing the cap to said neck portion, said locking means including a plurality of teeth extending radially outwardly from said second annular wall, each of said plurality of teeth including an outer surface facing outwardly, a top surface, a bottom surface and a transverse surface, the improvement wherein stretching of the material in a portion of the parison forming the teeth to an extent leading to cracking or rupturing thereof is inhibited by said top and said bottom surfaces are connected to said outer surface by first and second rounded edge portions, respectively, and said outer surface and said transverse surface are connected by a third rounded edge portion.

11. The blow molded container of claim 9, wherein said first and second rounded edge portions are each formed by a radius of curvature in the range of approximately 0.030 to 0.060 inches.

12. The blow molded container of claim 10, wherein said radius of curvature is in the range of approximately 0.035 to 0.040 inches.

13. In a method of blow molding a container having a body portion and a neck portion with locking teeth including the steps of extruding a parison formed of a thermoplastic material, positioning the parison between molds having inner surfaces shaped to produce a desired shaped container, injecting gas into the parison to expand the parison outwardly into abutment with the molds to form the container, wherein the improvement wherein stretching of the material in a portion of the parison forming the teeth to an extent leading to cracking or rupturing thereof is inhibited by forming rounded edges between surfaces of the teeth and providing inclined transition surfaces above and below the teeth which surfaces extend away from said teeth from near a root area thereof.

14. The method of claim 13, wherein each of said inclined transition surfaces forms an angle with respect to a longitudinal axis of said neck portion of between approximately 40 degrees and 50 degrees.

15. The method of claim 12, wherein the rounded edges of the teeth are each formed with a radius of curvature in the range of approximately 0.030 to 0.060 inches.

* * * * *